United States Patent

[11] 3,621,927

| [72] | Inventor | Alfred Newman Ormond<br>11969 E. Rivera Road, Santa Fe Springs,<br>Calif. 90670 |
|---|---|---|
| [21] | Appl. No. | 31,970 |
| [22] | Filed | Apr. 27, 1970 |
| [45] | Patented | Nov. 23, 1971 |

[54] UNITARY LOAD CELL
9 Claims, 3 Drawing Figs.

[52] U.S. Cl. .................................................. 177/211, 73/141 A
[51] Int. Cl. ................................................... G01g 3/14
[50] Field of Search ........................................ 177/208, 210, 211, 254, DIG. 9; 73/141

[56] References Cited
UNITED STATES PATENTS

| 2,472,047 | 5/1949 | Ruge | 73/141 A |
| 3,178,937 | 4/1965 | Bradley | 177/210 X |
| 3,366,189 | 1/1968 | Bellier | 177/211 X |

FOREIGN PATENTS

| 895,065 | 9/1953 | Germany | 177/DIG. 9 |

Primary Examiner—Richard B. Wilkinson
Assistant Examiner—George H. Miller, Jr.
Attorney—Pastoriza & Kelly ABSTRACT: A unitary load cell structure primarily useful for weighing includes a cylindrical casing, a force-transmitting member in an interior end portion of the casing, and a base member secured to the opposite end portion of the casing. A load element with its load-sensitive axis coaxial with the cylindrical casing is disposed within the casing between the force-transmitting member and the base member. Guide means in the form of first and second axially spaced diaphragms secured at their inner central portions to the force-transmitting member at axially spaced points and at their periphery to the cylindrical casing constrain movement of the force-transmitting member to an axial direction so that only an axial component of force applied to the force-transmitting member is transferred to the load element. The load element itself terminates at opposite ends in spherical surface portions which engage concave surface portions of greater radii of curvature at the lower end of the force-transmitting member and an upper central portion of the base respectively so that further isolation of bending moments is realized.

PATENTED NOV 23 1971 3,621,927

INVENTOR.
ALFRED N. ORMOND
BY Pastoriza & Kelly
ATTORNEYS

UNITARY LOAD CELL

This invention relates to load cells and more particularly to load cells of the type incorporating strain gages for providing an electrical output signal constituting a function of force applied to the load cell.

BACKGROUND OF THE INVENTION

Conventional load cells include a load element such as a block of material to which strain gages are attached. When a compression or tension force is applied to the block, strains are developed which are detected by the strain gages to thereby provide an electrical output signal constituting a function of the force in question.

Normally, a load cell or element will have a load-sensitive axis; that is, a particular direction in which the force to be measured should be applied in order to realize an accurate output reading. If other force components are present, such as might cause bending of the load element, spurious signals are developed with the result of inaccurate reading.

In weighing operations, a load cell of the above type can be used but it is essential that the load or weight be positioned exactly over the load-sensitive axis of the load element so that no horizontal force components are developed which could result in bending of the load element. In large commercial weighing operations, an operator cannot always exactly position an object to be weighed at the exact center of the weighing platform so that invariably bending moments are developed which can be transmitted to the load cell or element itself.

BRIEF DESCRIPTION OF THE PRESENT INVENTION

The present invention contemplates an improved load cell structure particularly useful for weighing wherein bending moments resulting from an offcenter positioning of an object to be weighed are essentially eliminated or isolated from reaching the load element itself. As a consequence, only the vertical force which corresponds to the weight will be transmitted to the load cell or element thereby assuring optimum accuracy in the output signal.

Briefly, the unitary load cell structure of the invention takes the form of a cylindrical casing with the axis of the cylinder disposed in a vertical direction when the device is to be used for a weighing operation. A force-transmitting member preferably in the form of a column is positioned in the upper end of the cylindrical casing free of any direct engagement with the casing, the axis of the column being coaxial with the axis of the cylindrical casing. A base member in turn is rigidly secured to the lower end of the cylindrical casing. A load element is positioned between the force-transmitting member and base member with its load-sensitive axis coaxial with that of the cylindrical casing.

The force-transmitting member in the above-described arrangement is connected to the cylindrical casing by a guide means. In the preferred embodiment of the invention, this guide means takes the form of first and second diaphragms in axially spaced relationship with each other having their central portions connected to upper and lower end portions of the force-transmitting column respectively and their peripheral portions connected to the cylindrical casing. With this arrangement, movement of the force-transmitting column is constrained to the axial direction of the cylindrical casing; that is, along the force-sensitive axis of the load element. Bending moments as might occur from an offcenter load on the force-transmitting column to be weighed are thus prevented from reaching the load element itself.

Further isolation of any bending moments to the load element is achieved by pivot means between the opposite ends of the load element and the force-transmitting column and base respectively. The preferred form of the pivot means is defined by terminating opposite ends of the load element itself in spherical surface portions having centers of radii of curvature at the center of the load element itself. The engaging portions of the force-transmitting column and base member respectively comprise concave surfaces of radii of curvature greater than that of the convex surface so that a rolling point of contact of engagement between the load element and the force-transmitting member and base member takes place.

BRIEF DESCRIPTION OF THE DRAWINGS

A better understanding of the invention will be had by now referring to a preferred embodiment thereof as illustrated in the accompanying drawings, in which.

DETAILED DESCRIPTION OF THE PREFERRED EMBODIMENT

Figure 1:
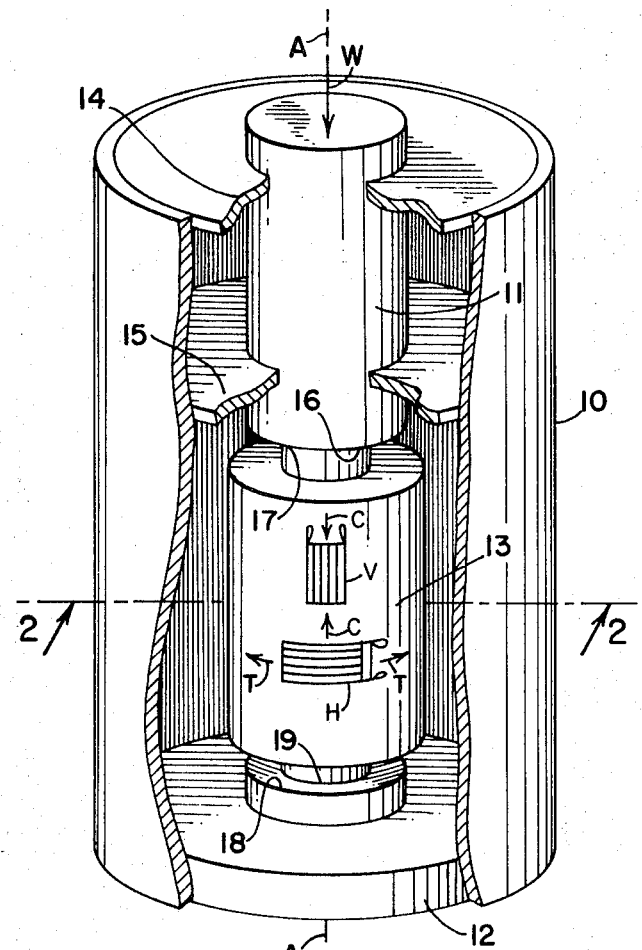
FIG. 1 is a cutaway perspective view of a unitary load cell in accord with the present invention.

Referring to FIG. 1 there is shown a vertically oriented cylindrical casing 10. In the upper interior portion of this casing there is provided a force-transmitting member in the form of a column 11 coaxially positioned relative to the axis A—A of the cylindrical casing 10. This force-transmitting column 11 is free of any direct physical engagement with the casing 10. A base member 12 in turn is rigidly secured to the lower end of the casing as shown.

Between the force-transmitting column 11 and base member 12 there is positioned a load element 13 having its load sensitive axis coaxial with the axis A—A. A guide means in the form of first and second diaphragms 14 and 15 connects the force-transmitting column 11 to the upper portion of the cylindrical casing 10 in such a manner as to constrain movement of the force-transmitting member 11 to an axial direction. As shown, these diaphragms have their central portions rigidly secured to upper and lower end portions of the force-transmitting column 11 and their peripheries securely connected to the cylindrical casing 10. The diaphragms are parallel to each other and normal to the axis A—A of the cylindrical casing in the absence of any force applied to the force-transmitting column 11. With this geometry, it will be evident that movement of the force transmitting member is limited to the direction of the axis A—A.

The lower end of the force-transmitting member 11 terminates in a concave surface 16 engaging an upper convex surface 17 constituting the upper end of the load element 13. Similarly, a central portion of the base member 12 terminates in a concave surface 18 engaging a convex surface 19 constituting the lower end of the load element 13. As shown, the load element 13 includes vertical and horizontal strain gage means V and H having their sensitive axes disposed in vertical and horizontal directions respectively.

Figure 2:
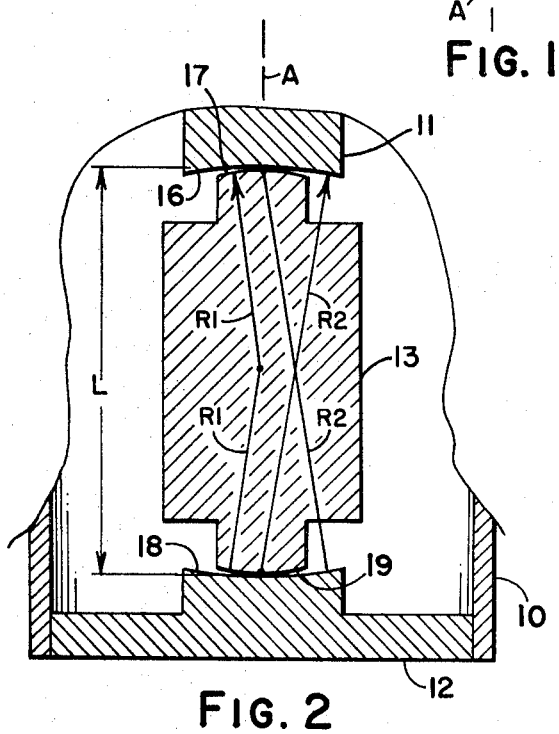
FIG. 2 is a fragmentary cross section taken in the direction of the arrows 2—2 of FIG. 1.

Referring now to FIG. 2, details of the various engaging surfaces 16 17 and 18 19 will be described. Essentially, the convex surfaces 17 and 19 constituting the opposite ends of the load element 13 are spherical surface portions having centers of radii of curvature at the geometrical center of the load element 13. These radii are indicated by the letters R1. The concave surfaces 16 and 18 at the lower end of the force-transmitting column 11 and central portion of the base 12 respectively in turn have radii of curvature designated by the letters R2 which radii are greater than the radii R1. As a consequence, the opposite ends of the load element 13 engage in point-rolling contact with the force-transmitting column 11 and central portion of the base 12. Any force transmitted between the force-transmitting column 11 and upper portion of the load element 13 and between the lower portion of the load element 13 and the central portion of the base member 12 will thus necessarily be directed towards the geometrical center of the load element and thus the load element will not be subject to any bending moments.

Figure 3:
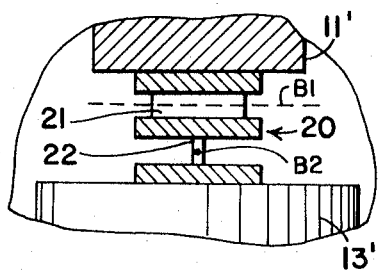
FIG. 3 is another fragmentary view partly in cross section of a modified form of the invention.

As an alternative to the engaging surfaces described in FIG. 2, flexure means may be provided to connect the ends of the load element with the force-transmitting column and central base portion respectively. An example of such a flexure means is illustrated in FIG. 3 at 20. This flexure means includes two flexure webs 21 and 22 disposed at right angles to each other so that two degrees of freedom are provided. More specifically, bending of the flexure 21 takes place about the horizontal axis B1 in the plane of the drawing and bending of the flexure 22 takes place about the axis B2 normal to the plane of the drawing. Effectively, the flexure will thus isolate any bending moments so that only an axial component of force will be transmitted through the modified force-transmitting column designated 11' to the upper end of the modified load element designated 13'. A similar flexure means would be provided between the lower end of the modified load element 13' and the central portion of the base member for the cylindrical casing. The preferred pivot means, however, constitute the spherical bearing surfaces.

OPERATION

Assuming the unitary load cell is to be used in a weighing operation, the object to be weighed or other load is applied to the upper end of the force-transmitting column 11 of FIG. 1. This force or weight is indicated by the arrow W. Normally, a weighing platform (not shown) would be rigidly secured to the upper end of the force-transmitting column 11.

The weight in question will cause a slight axial movement of the load-transmitting column 11 in a downward direction, this movement being guided by the first and second diaphragms 14 and 15 such that it can only take place in the direction of the axis A—A; that is, in a vertically downward direction. The diaphragms 14 and 15 thus isolate to a substantial degree any bending moments that might be present as a consequence of offcenter loading of the weight on the platform.

The downward movement of the load-transmitting column 11 will place the load element 13 in compression, this compressive force being exerted between the opposite spherical surface ends of the load element as described in FIG. 2. Because of the rolling point contact of the engaging surfaces as described, further isolation of any bending moments is assured. Suitable electrical signals may then be derived from the strain gages V and H as shown in FIG. 1 to provide an electrical output reading constituting a function of the weight on the force-transmitting column 11.

In the event flexure means are used such as illustrated at 20 in place of the engaging surfaces described in FIG. 2, the two degrees of freedom afforded by the flexure means assures further isolation of any bending moments.

The entire unitary load cell made up of the combination of the cylindrical casing, force-transmitting column, load element itself, base member, and first and second diaphragms is compact, rugged, economical to manufacture, and ideally suited to weighing operations. Because of isolation of bending moments both by means of the diaphragms and the engaging surfaces with opposite ends of the load element or flexure means for effecting the transmission of force to the load element, greater accuracy in the output readings can be realized over those with prior art load cell arrangements.

What is claimed is:

1. A load cell including: a cylinder; a base member rigidly secured to one end of said cylinder; a force-transmitting member axially positioned in the other end of said cylinder; a load element between said base member and force-transmitting member with its load-sensitive axis coaxial with the axis of said cylinder; first and second axially spaced diaphragms secured at their inner central portions to said force-transmitting member at axially spaced points and at their periphery to said cylinder, the planes of said diaphragms being parallel to each other and normal to the axis of said cylinder; and pivot means between said force-transmitting member and the juxtaposed end of said load element, and between said base member and the juxtaposed opposite end of said load element whereby movement of said force-transmitting member is constrained to an axial direction so that only the axial component of force applied to said force-transmitting member is transferred through said pivot means to said load element.

2. A load cell according to claim 1, in which said pivot means are defined by terminating opposite ends of said load element in spherical surface portions having centers of radii of curvature at the center of said load element, the juxtaposed portions of said force-transmitting member and base member respectively comprising concave surfaces of radii of curvature greater than that of the first-mentioned radii of curvature whereby a rolling point contact of said load element with said force-transmitting member and base member takes place so that bending moments are isolated from said load element.

3. A unitary weighing load cell comprising: a vertically disposed cylindrical casing; force-transmitting column coaxially positioned within the upper interior portion of said casing and free of any direct engagement with said casing; a load element axially positioned between said force-transmitting column and base member with its load-sensitive axis vertical and coaxial with the axis of said casing, pivot means between the ends of said load element and force-transmitting column and base member respectively, said base member restraining through said pivot means any vertical downward movement of the lower end of said load element relative to said casing, said force-transmitting column having its lower end positioned to transmit a downward force through said pivot means to the upper end of said load element to thereby place said load element in compression; and guiding means connected between said force-transmitting column and said casing confining movement of said column to the direction of the axis of said casing whereby substantially only the vertical downwardly directed component of any force applied to the upper end of said force transmitting column is transmitted to said load element, said pivot means including upper flexure means having at least two degrees of freedom secured between the lower end of said force-transmitting member and the upper end of said load element; and lower flexure means having at least two degrees of freedom secured between an upper central portion of said base member and the lower end of said load element whereby any bending moments transmitted by said force-transmitting column to said load element are substantially isolated by said upper and lower flexure means.

4. The subject matter of claim 3, in which said guiding means includes at least two axially spaced diaphragms secured at their inner central portions to said force-transmitting column adjacent to its said upper and lower ends respectively and at their peripheries to said casing, the planes of said diaphragms being parallel to each other and normal to the axis of said casing in the absence of any force on said force-transmitting column.

5. A unitary weighing load cell comprising: a vertically disposed cylindrical casing; force-transmitting column coaxially positioned within the upper interior portion of said casing and free of any direct engagement with said casing; a load element axially positioned between said force-transmitting column and base member with its load-sensitive axis vertical and coaxial with the axis of said casing, pivot means between the ends of said load element and force-transmitting column and base member respectively, said base member restraining through said pivot means any vertical downward movement of the lower end of said load element relative to said casing, said force-transmitting column having its lower end positioned to transmit a downward force through said pivot means to the upper end of said load element to thereby place said load element in compression; and at least two axially spaced diaphragms secured at their inner central portions to said force-transmitting column adjacent to its upper and lower ends respectively and at their peripheries to said casing, the planes of said diaphragms being parallel to each other and normal to the axis of said casing in the absence of any force on said force-transmitting column, to confine movement of said column to the direction of the axis of said casing whereby substantially only the vertical downwardly directed component of any force applied to the upper end of said force-transmitting column is transmitted to said element.

6. The subject matter of claim 5, including at least two strain gage means secured to said load element intermediate its upper and lower ends, the sensitive axis of said strain gage means being disposed vertically and horizontally respectively.

7. The subject matter of claim 5, in which said pivot means are defined by terminating the lower end of said force-transmitting column in a concave surface and the upper end of said load cell in an opposed convex surface of lesser radius of curvature than said concave surface to define substantially a point contact, an upper central portion of said base member terminating in a concave surface and the lower end of said load cell terminating in an opposed convex surface of lesser radius of curvature than said concave surface to define substantially a point contact whereby bending moments are isolated from transmission to said load cell by said point contacts.

8. The subject matter of claim 7, in which said guiding means includes at least two axially spaced diaphragms secured at their inner central portions to said force-transmitting column adjacent to its said upper and lower ends respectively and at their peripheries to said casing, the planes of said diaphragms being parallel to each other and normal to the axis of said casing in the absence of any force on said force-transmitting column.

9. The subject matter of claim 7, in which the radius of curvature of each convex surface is equal to one-half the length of said load element as measured between said point contacts.

* * * * *